United States Patent
Zhang et al.

(10) Patent No.: US 7,822,981 B2
(45) Date of Patent: Oct. 26, 2010

(54) COMMUNICATION APPARATUS AND AUTHENTICATING METHOD

(75) Inventors: Yibo Zhang, Osaka (JP); Atsuhiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 1024 days.

(21) Appl. No.: 11/579,691

(22) PCT Filed: Oct. 12, 2005

(86) PCT No.: PCT/JP2005/018759
§ 371 (c)(1),
(2), (4) Date: Nov. 6, 2006

(87) PCT Pub. No.: WO2006/043446
PCT Pub. Date: Apr. 27, 2006

(65) Prior Publication Data
US 2008/0126804 A1    May 29, 2008

(30) Foreign Application Priority Data
Oct. 19, 2004   (JP)   ............................ 2004-304092

(51) Int. Cl.
*H04L 9/32* (2006.01)
(52) U.S. Cl. ..................... 713/169; 713/168; 713/170
(58) Field of Classification Search ......... 713/168–174, 713/182–186, 202; 709/229, 225
See application file for complete search history.

(56) References Cited

U.S. PATENT DOCUMENTS 6,973,567 B1 * 12/2005 Riley et al. ................. 713/151

(Continued)

FOREIGN PATENT DOCUMENTS

JP   62-251945   11/1987

(Continued)

OTHER PUBLICATIONS

Paragraphs [0002], [0018], [0020] and [0022] and Figs. 2 and 3 of JP 09-212458, published Aug. 15, 1997 (with English translation).

(Continued)

*Primary Examiner*—Matthew B Smithers
*Assistant Examiner*—Jing Sims
(74) *Attorney, Agent, or Firm*—Wenderoth, Lind & Ponack, L.L.P.

(57) ABSTRACT

A communication apparatus and authenticating method prevent mistaken authentication at initial authentication in a connection between communication apparatuses. The communication apparatus includes an authentication processing unit which manages each state of the communication apparatus. The states include an authentication initiation permissible state, an authentication initiation impermissible state, an authentication initiation state, an authenticating state, an authentication successful state, an authentication unsuccessful state and an authentication completed state. Additionally, the authentication processing unit performs authentication with another communication apparatus, and stops the authentication when a plurality of authentication messages is received while in the authentication initiation state and the authenticating state. A conflict detection unit detects that a plurality of authentication messages has been received; a display unit displays each state; and an input unit accepts the state change from authentication initiation permissible to authentication initiation (an authentication initiation operation), and from authentication successful to authentication completed (an authentication completion operation).

26 Claims, 10 Drawing Sheets

U.S. PATENT DOCUMENTS

| | | |
|---|---|---|
| 7,234,061 B1 * | 6/2007 | Diab et al. .................. 713/176 |
| 7,272,728 B2 * | 9/2007 | Pierson et al. .............. 713/194 |
| 2005/0010680 A1 | 1/2005 | Zick et al. |
| 2005/0114880 A1 * | 5/2005 | Gould ......................... 725/25 |
| 2007/0004356 A1 * | 1/2007 | Sessink et al. .............. 455/222 |

FOREIGN PATENT DOCUMENTS

| | | |
|---|---|---|
| JP | 4-117040 | 4/1992 |
| JP | 5-327693 | 12/1993 |
| JP | 9-212458 | 8/1997 |
| JP | 2001-52122 | 2/2001 |
| JP | 2002-217890 | 8/2002 |
| JP | 2002-314532 | 10/2002 |
| JP | 2002-342271 | 11/2002 |
| JP | 2003-87232 | 3/2003 |
| JP | 2003-308405 | 10/2003 |

OTHER PUBLICATIONS

IEEE Standards 802.11i-2004, Chapter 8, pp. 39-41.

* cited by examiner

COMMUNICATION APPARATUS AND AUTHENTICATING METHOD

TECHNICAL FIELD

The present invention relates to a communication apparatus and an authenticating method for connecting communication apparatuses and carrying out communication after performing mutual authentication on the connection between the communication apparatuses.

BACKGROUND ART

In recent years, wireless LAN and power-line communications (PLC), which do not need supplementary wiring for home networks, have started to become commonplace. However, when trying to add a new apparatus into such a home network, it is necessary to perform an initial period authentication for the connection (only once at the outset) with an apparatus that will serve as a base unit apparatus, and a new apparatus that will serve as a portable handset apparatus. Since these communication methods, such as wireless LAN and power-line communications (PLC), use open-source media and can experience interference between apparatuses, there is a possibility that a non-predetermined apparatus will connect by mistake in the case where mutual authentication is not performed correctly in the initial connection period for each apparatus.

An authentication scheme based on a common key is generally used for this kind of mutual authenticating method. For example, in the international standard for wireless LAN, IEEE 802.11i, an authentication scheme like the following is specified (see for example, Non-patent Document 1). FIG. 1 is a sequence diagram for this authentication scheme. After authentication is initialized, an authentication request 11 is sent to a wireless base station (AP) 2 from a station (STA) 1. Upon receiving the authentication request 11, the wireless base station (AP) 2 creates a challenge plaintext (CT) 12 and returns it to the station (STA) 1. The station (STA) 1 encrypts the received challenge plaintext 12 by its common key PSK, and returns a challenge cryptogram (PSK(CT)) 13 to the wireless base station (AP) 2. The wireless base station (AP) 2 decrypts the received challenge cryptogram 13 by its own common key PSK, and when the decrypted item matches the challenge inside the challenge plaintext 12 that was sent to the station (STA) 1, an authentication response (successful) 14 is returned to the station (STA) 1, and in the case where they do not match, an authentication response 14 (unsuccessful) is returned to the station (STA) 1. Provided here that the common key PSK of the station (STA) 1 and the common key PSK of the wireless base station (AP) 2 must be identical to the keys set or distributed beforehand.

A simple method is actually preferable to a complicated method for the setting and distribution method of the communication apparatus' common key on a home network. For example, methods such as storing a key inside a communication apparatus beforehand, or building a key generation procedure into a communication apparatus, so that a user may choose a corresponding key by simply entering a key code are conceivable. By choosing a key setting method like this, an input means for key settings which a communication apparatus must include, can be easily implemented at an extremely low cost.

[Non-patent Document 1] IEEE Std 802.11i-2004, Chapter 8, Page 39-Page 41

However, when the input means is streamlined in the setting or distribution method for the common key as above, the number of pattern functions which can be inputted decreases and the chosen key duplicates; as a result, the possibility increases that authentication between non-predetermined apparatuses, which happen to have the same common key, will be allowed to succeed.

Because avoiding mistaken authentication is not considered in the authenticating method in Non-patent Document 1 above, two apparatuses in the same interference range (for example, neighboring houses) which have chosen the same common key, and are using wireless LAN or power line communications, may mistakenly authenticate and connect to each other. In addition, as for mischief and deliberate attacks, when a mistaken authentication occurs merely by choosing the same common key, and a connection is made, it is possible to easily perform eavesdropping and identity theft against an apparatus in a neighboring house.

Therefore, the present invention has been conceived in view of the above problems, and an object of the present invention is to provide a communication apparatus and an authenticating method, which can prevent mistaken authentication during initial authentication in a connection with a communication apparatus.

SUMMARY

In order to achieve the object above, the communication apparatus in the present invention performs authentication for a connection with an other communication apparatus and then performs communication with the other communication apparatus. The communication apparatus includes a state management unit which manages a state in the authentication as one state among a plurality of predetermined states; a duplication detection unit which detects, in a specified state among the plurality of states, a duplicate receipt of a message related to authentication transmitted from another communication apparatus; and an authentication unit, which continues an authentication operation in the case where the duplication detection unit does not detect a duplicate receipt of the message related to the authentication within a specified time period, but receives one of the message related to the authentication, in the specified state, and stops the authentication operation in the case where the duplicate receipt of the message related to the authentication is detected by the duplication detection unit within the specified time period, in the specified state.

By doing so, devices performing mutual authentication for initial authentication in the connection between communication apparatuses are limited, authentication in the interference range between more than two pairs of devices can be avoided and message fraud can also be made impossible. Accordingly, even if a streamlining of input means occurs such that the ease of selecting the same common key increases, it will be possible to prevent a mistaken authentication during initial authentication.

Here, the plurality of states are: an "authentication initiation permissible" state, an "authentication initiation impermissible" state, an "authentication initiation" state, an "authenticating" state, an "authentication successful" state, an "authentication unsuccessful" state and an "authentication completed" state. It is preferable that the state management unit manages a state in the authentication operation as one of the states among the "authentication initiation permissible" state, the "authentication initiation impermissible" state, the "authentication initiation" state, the "authenticating" state, the "authentication successful" state, the "authentication unsuccessful" state and the "authentication completed" state.

The communication apparatus further includes an authentication initiation acceptance unit which accepts an authentication initiation operation when the state is an "authentication initiation permissible" state. The state management unit may shift the state from the "authentication initiation permissible" state to the "authentication initiation" state in the case where the authentication initiation operation is accepted by the authentication initiation acceptance unit, and the authentication initiation acceptance unit may accept the message related to the authentication, when the state is the "authentication initiation" state.

The communication apparatus further includes an authentication completion acceptance unit which accepts an authentication completion operation when the state is the "authentication successful" state. The state management unit may shift the state from the "authentication successful" state to the "authentication completed" state when the authentication completion operation is accepted by the authentication completion acceptance unit; and the authentication unit may perform an authentication completion process when the authentication completion operation is accepted by the authentication completion acceptance unit.

The communication apparatus may further include a display unit which displays the state when the state is at least one of the "authentication initiation permissible" state, the "authentication initiation impermissible" state, the "authentication initiation" state, the "authenticating" state, the "authentication successful" state, the "authentication unsuccessful state" and the "authentication completed" state.

In this way, even if mistaken authentication proceeds, mistaken authentication by the display of the state, authentication and judgment by a user, and so on, can be avoided.

The communication apparatus may further include a timer management unit which manages each state: the "authentication initiation impermissible" state, the "authentication initiation" state, the "authenticating" state, the "authentication successful" state, the "authentication unsuccessful" state and the "authentication completed" state by an initial value which is the specified time period set in advance with respectively differing timers, and adjusts the initial value of each timer after initiating authentication. With this, the efficiency of authentication may be improved.

Also, the duplication detection unit may transmit a conflict notification to the other communication apparatus, which has transmitted the message related to the specified authentication, and where the message related to the specified authentication is received in duplicate, in the case where the state is one of the "authentication initiation" state and the "authenticating" state; the conflict notification includes a time value which indicates the length of time at which the other apparatus should be in the "authentication initiation impermissible" state. With this, it is possible to control an authentication resumption time in another communication device.

Note that the present invention may be realized not only as the kind of communication apparatus above but also as an authenticating method which includes the characteristic units included in the communication apparatus as steps, and as a program which causes a computer to execute these steps. It goes without saying that this sort of program could be distributed through a recording medium such as a CD-ROM and a transmission medium such as the Internet.

With the communication apparatus in the present invention, it is possible to perform authentication correctly between communication apparatuses possessing a simple common key selection device, without a mistaken authentication being performed.

In addition, with the communication apparatus in the present invention, not only accidental mistaken authentication, but also mistaken authentication carried out by willful attack can be addressed.

Note that it is also possible to apply the present invention to a wireless LAN as well as wired or wireless communications which are not power-line communications (for example, Bluetooth, ECHONET), and the particular effect of preventing mistaken authentication can be obtained.

NUMERICAL REFERENCES

Figure 1:
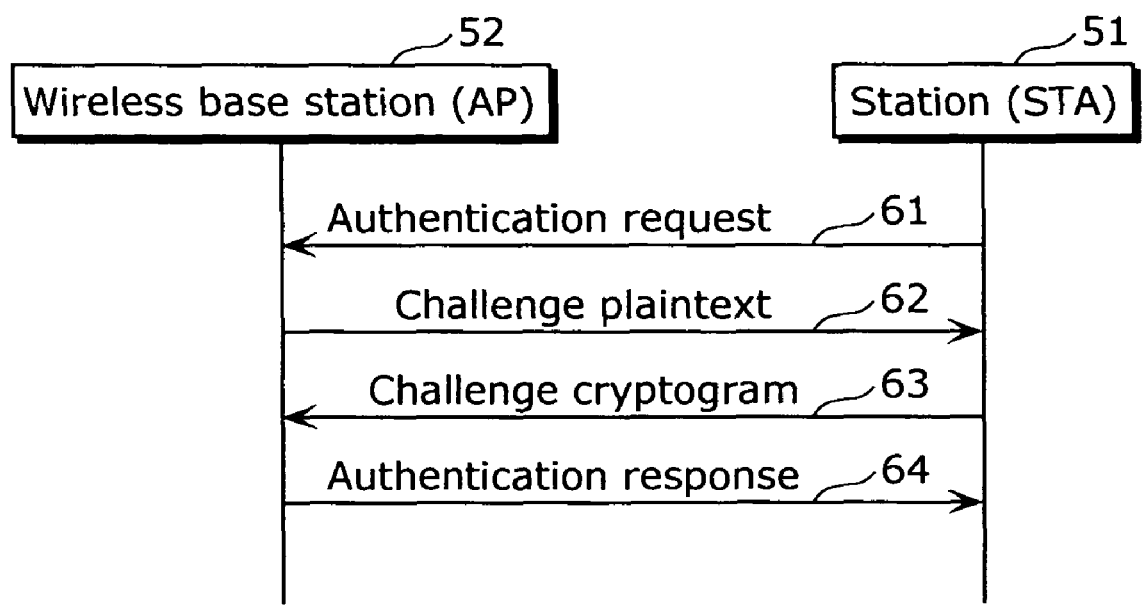
FIG. 1 is a conventional authentication sequence diagram.

1 Communication apparatus
1a Master communication apparatus
1b Slave communication apparatus
10 Notification information
11 Connection information request
12 Connection information response
13 Authentication request
14 Challenge plaintext
15 Challenge cryptogram
16 Authentication response
17 Conflict notification

DETAILED DESCRIPTION

Below, each embodiment of the present invention is described with reference to its respective figures.

First Embodiment

Figure 2:
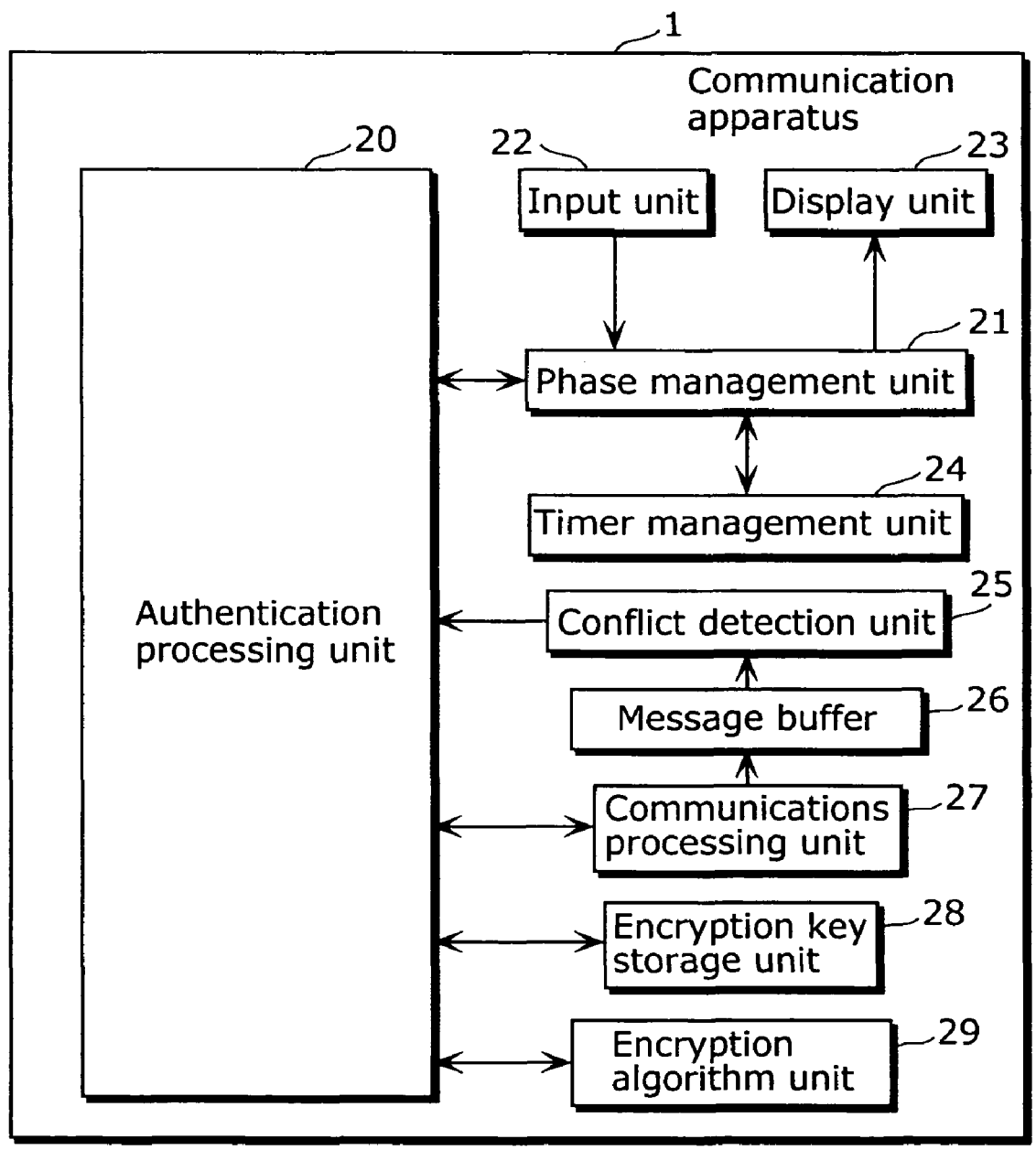
FIG. 2 is a block diagram that shows the structure of a communication apparatus according to the present invention.

FIG. 2 is a block diagram that shows the structure of a communication apparatus in the first embodiment of the present invention.

A communication apparatus 1 is a communication apparatus for performing communications with other communication apparatuses, after performing an initial authentication for a connection with another communication apparatus, and as shown in FIG. 2, includes an authentication processing unit 20, a phase management unit 21, an input unit 22, a display unit 23, a timer management unit 24, a conflict detection unit 25, a message buffer 26, a communication processing unit 27, an encryption key storage unit 28, as well as an encryption algorithm unit 29.

The authentication processing unit 20 manages and controls the connection and authentication processing sequence, and directs the transmission processing unit 27 to send and receive a message related to authentication (below, this is also called an authentication message). In addition, the authentication processing unit 20 acquires the necessary common encryption key (common key) for the encryption or decryption of the challenge from the encryption key storage unit 28, and performs the encryption or decryption of the challenge using the encryption algorithm unit 29. Further, the authentication processing unit 20 changes a state according to an instruction to switch phases from the phase management unit 21, directs the setting or the start-up of the timer to the timer management unit 24, receives a notification of the time elapsement and performs a predetermined process. Also, the authentication processing unit 20 receives a notification from the conflict detection unit 25 concerning the double reception of an authentication message in the message buffer 26 and performs a conflict process.

The communication processing unit 27 sends and receives the message following a instruction from the authentication processing unit 20. The encryption key storage unit 28 stores the common key necessary for the encryption or decryption of the challenge. The phase management unit 21 receives a directive from the input unit 22 and directs the authentication processing unit 20 to change phases. The timer management unit 24 monitors the pre-determined time lapse specified from a specified point in time, and transmits this to the authentication processing unit 20 once the predetermined time period has elapsed. The conflict detection unit 25 receives the instruction from the authentication processing unit 20, acquires the message from the communication processing unit 27 and saves this message in the message buffer 26; once there is more than one message, the conflict detection unit 25 notifies the authentication processing unit 20.

The input unit 22 accepts an authentication initiation operation or an authentication completion operation, both of which are instructions from outside (a user). The input unit 22 is assumed basically to be a button. A state change (authentication initiation operation) from "authentication initiation permissible" to "authentication initiation" is performed by pressing this button down. The state change from "authentication successful" to "authentication completed" (authentication completion operation) is also implemented by pressing this button down. For example, in the case where there is just one button, the length of time or the number of times the button is pressed distinguishes approval from disapproval, in order to give an approval or disapproval instruction for the authentication successful result. Likewise, in the case where there are two buttons, one can give a instruction for approval and another for disapproval.

The display unit 23 displays each state: "authentication initiation permissible", "authentication initiation impermissible", "authentication initiation", "authenticating", "authentication successful", "authentication unsuccessful" and "authentication completed". The display unit 23 is composed of three LEDs, LED1, LED2 and LED3; "authentication initiation permissible" lights up LED1, "authentication initiation impermissible" flashes LED1, "authentication initiation" lights up LED2, "authenticating" flashes LED2, "authentication successful" flashes LED3, "authentication unsuccessful" lights up LED3, and "authentication completed" is displayed when LED1, LED2 and LED3 are all lit up. Note that the number of LED that compose the display unit 23 is not limited to three, anything that can display the state sufficiently is fine. For instance the LED may be one color or three colors. Also, an audio display may be used by a speaker as an auxiliary means. In the case where the communication apparatus includes another type of display means (for example, liquid crystal), the state may be displayed in letters or in code. Likewise, in the case where a master communication apparatus and a slave apparatus include display units of varying type, the apparatuses may use the respective varying display method for each apparatus. In addition, when a predetermined message or a directive is not received before the timer runs down, this may be displayed as a state by flashing LED1, LED2 and LED3, and the user may be notified.

Next, the operation is described for a situation where initial authentication is performed for a connection when a communication apparatus 1b, composed as above, is newly added to a network to which another communication apparatus 1a, composed as above, is already connected. Here, the communication apparatus already attached to the network is called a master communication apparatus. Meanwhile, a communication apparatus that tries newly to connect to the network, by performing authentication with the master communication apparatus, is called a slave communication apparatus.

Included in a message sent from the slave communication apparatus to the master communication apparatus are a connection information request, an authentication request and a challenge cryptogram. The connection information request is a message for requesting an ID and a parameter for communications from the master communication apparatus. The authentication request is a message for requesting authentication from a master communication apparatus and includes the slave communication apparatus' ID information. The challenge cryptogram is a message for proving possession of a common key and the challenge includes information encrypted with a common key.

Meanwhile, included in the message sent to the slave communication apparatus from the master communication apparatus are notification information, a connection information response, a challenge plaintext and an authentication response. The notification information is a message for notifying the slave communication apparatus of the master communication apparatus's ID and a parameter for communications. The connection information response is a message for notifying the slave communication apparatus of the master communication apparatus' ID and the parameter for communications as a response to the connection information request from the slave communication apparatus. The challenge plaintext is a message for testing whether or not the slave communication apparatus has the same common key, and includes for example 128-byte random text information. The authentication response is a message for notifying whether or not authentication was successful. Here, the connection information request and notification information is transmitted in a broadcast communication (broadcast). Messages besides this message are all transmitted by unicast communications. A message format identical to that already determined in the IEEE 801.11i standard may be used for the format of these messages. Note that for implementation, there is no need to conform to the format prescribed in the IEEE 801.11i standard, especially for cases other than wireless LAN.

Figure 3:
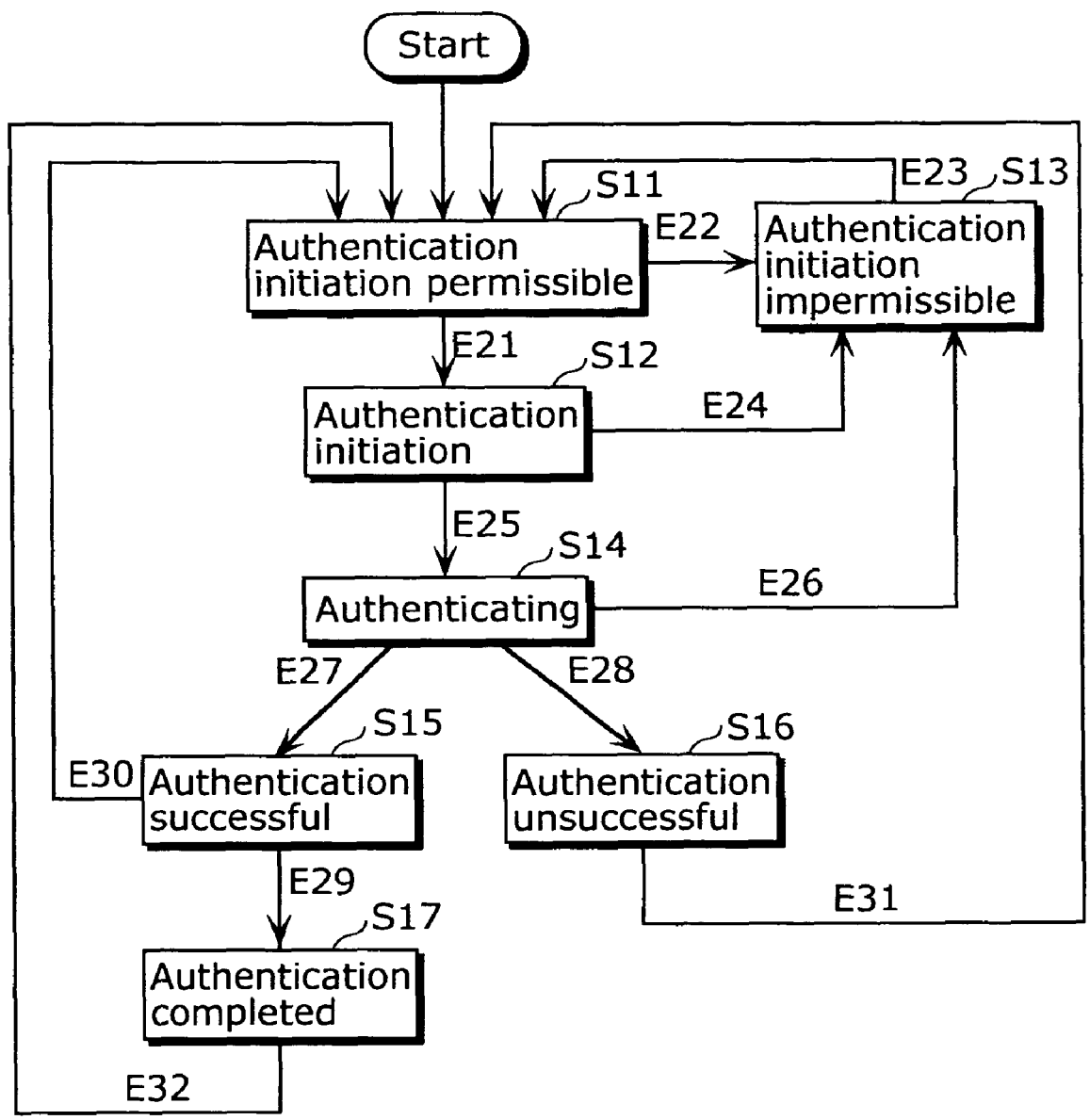
FIG. 3 is a state shift diagram common to the communication apparatuses.

Next, a common state for the authentication in a master communication apparatus and a slave communication apparatus will be described using FIG. 3.

After either a master or slave communication apparatus is started up, the communication apparatus will be in an "authentication initiation permissible" state in S11. The communication apparatus is shifted from the "authentication initiation permissible" state in S11 to the "authentication initiation state" in S12 by a button operation from the input unit 22 (E21). So long as the communication apparatus is not in the "authentication initiation state" in S12, it will not transmit nor will it receive any authentication messages. In the "authentication initiation permissible" state in S11, when the connection information request, or the notification information sent by broadcast communication is received (E22), the communication apparatus shifts to the "authentication initiation impermissible" state in S13. After entering the "authentication initiation impermissible" state in S13, when a predetermined time set by the timer management unit 24 elapses (E23) the communication apparatus returns to the "authentication initiation permissible" state in S11. The transmission and reception of notification information, or, the connection information request and the connection information response, is carried out in the "authentication initiation state" in S12, between a master communication apparatus and a slave communication apparatus. In this interval, when a plurality of messages of the same type is received within a predetermined timeframe (E24), set by the timer management unit 24, all of these messages are rejected and the apparatus shifts to the "authentication initiation impermissible" state in S13. On the other hand, when all messages are received in only one set in a predetermined timeframe (E25), the communication apparatus shifts to the "authenticating" state in S14. The four messages: the authentication request, the challenge plaintext, the challenge cryptogram and the authentication response, are exchanged between the master communication apparatus and the slave communication apparatus in the "authenticating" state in S14. In this interval, when a plurality of messages of the same type is received in the predetermined time period set by the timer management unit 24 (E26), these messages are rejected and the communication apparatus is shifted to the "authentication initiation impermissible" state in S13. A communication apparatus that has transmitted or received (E27) an authentication response (successful) shifts to the "authentication successful" state in S15. In contrast, a communication apparatus that has transmitted or received (E28) an authentication response (unsuccessful) shifts to the "authentication unsuccessful" state in S16. For a communication apparatus in the "authentication successful" state in S15, the communication apparatus shifts state to the "authentication completed" in S17 when there is a button operation from the input unit 22 (E29) within a specified time period. If not (E30), authentication is revoked and the communication apparatus returns to the "authentication initiation permissible" in S11. The "authentication unsuccessful" state in S16 returns to the "authentication initiation permissible" state in S11 after the elapsement of the predetermined time period set by the timer management unit 24 (E31). The "authentication completed" state in S17 also returns to the "authentication initiation permissible" state in S11 after the elapsement of the predetermined time period set by the timer management unit 24 (E32).

Figure 4:
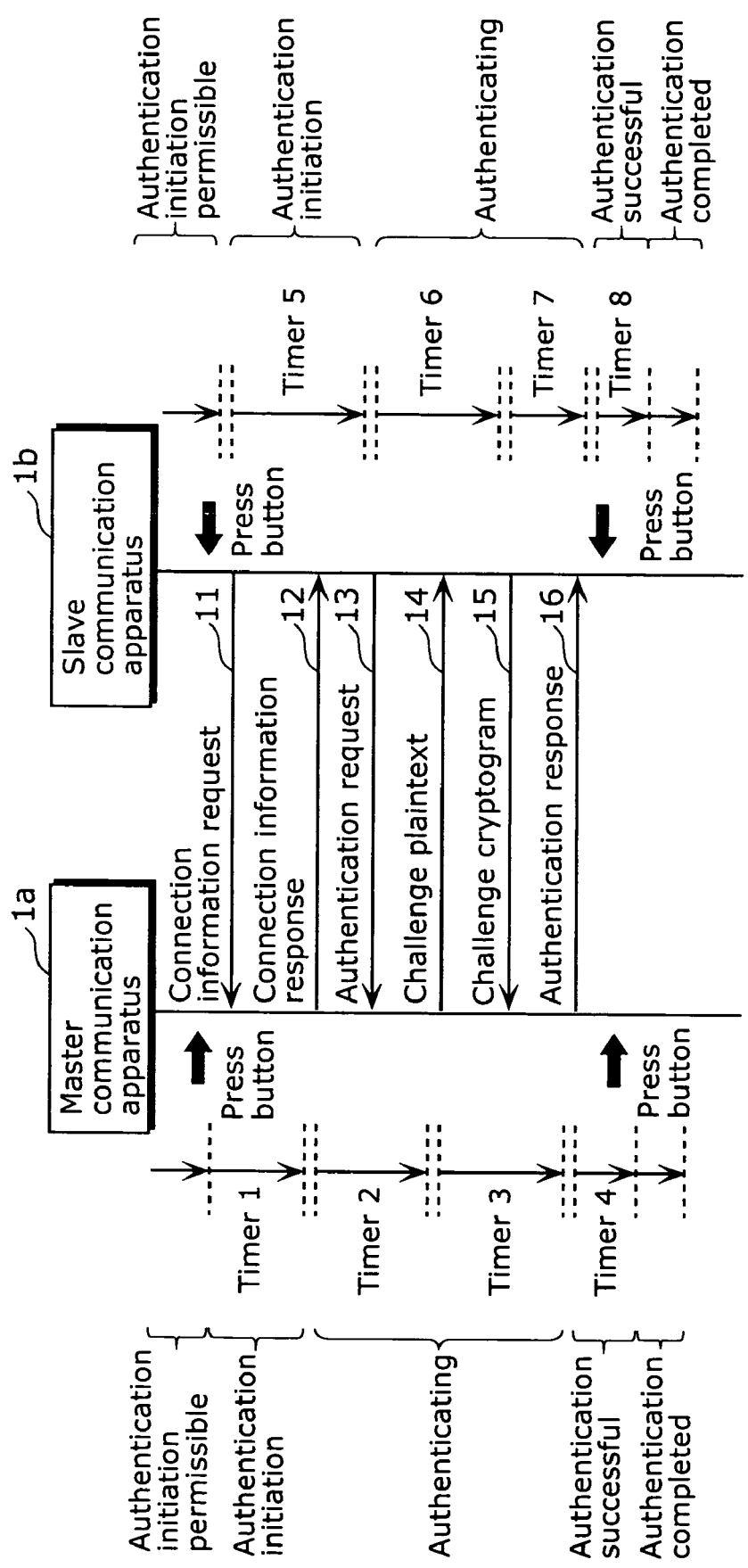
FIG. 4 is an authentication sequence diagram in the first embodiment in the present invention.

FIG. 4 is a diagram that shows the authentication sequence according to the first embodiment. When a master communication apparatus 1a receives a directive from a button of the apparatus' own input unit 22a, the master communication apparatus 1a starts up its own timer 1. Whereas a slave communication apparatus 1b simultaneously transmits the connection information request 11 in a broadcast communication after receiving a directive from a button on the apparatus' own input unit 22b, and starts up its own timer 5. The master communication apparatus 1a which has entered into the "authentication initiation state" beforehand receives the connection information request 11 and returns the connection information response 12 to the slave communication apparatus 1b. The master communication apparatus 1a which has sent out the connection information response 12 starts up its own timer 2. Here, while the timer 1 is in effect, when a plurality of the connection information requests 11 is received, not only from the slave communication apparatus 1b but also from an apparatus other than the slave apparatus, the authentication processing unit 20a stops authentication and shifts to the "authentication initiation impermissible" state.

On the other hand the slave communication apparatus 1b, which had sent out the connection information request 11, waits for the connection information response 12 while the timer 5 is in effect, and when the slave communication apparatus 1b receives a plurality of the connection information responses 12 from not only the master communication apparatus 1a, but also from an apparatus other than the master apparatus, the authentication processing unit 20b stops the authentication and shifts to the "authentication initiation impermissible" state. In the case where only one of the connection information responses 12 is received, the slave communication apparatus 1b returns the authentication request 13 to the master communication apparatus 1a and starts up a timer 6.

Meanwhile, the master communication apparatus 1a waits for the authentication request 13 while the timer 2 is in effect, and when the master communication apparatus 1a receives a plurality of the authentication requests 13 not only from the slave communication apparatus 1b but also from an apparatus other than the slave apparatus, the authentication processing unit 20a stops the authentication and shifts to the "authentication initiation impermissible" state. In the case where only one of the authentication requests 13 is received from the slave communication apparatus 1b, the master communication apparatus 1a returns the challenge plaintext 14, which includes the challenge, to the slave communication apparatus 1 and simultaneously starts up a timer 3.

Meanwhile, the slave communication apparatus 1b waits for the challenge cryptogram 14 while the timer 6 is in effect, and when a plurality of the challenge plaintexts 14 is received, not only from the master communication apparatus 1a but also from an apparatus other than the master apparatus, the authentication processing unit 20b stops the authentication and shifts to the "authentication initiation impermissible" state. In the case where only one of the challenge plaintexts 14 is received, the slave communication apparatus 1b encrypts the challenge by the common key stored at the encryption key storage unit 28b, returns a challenge cryptogram 15 to the master communication apparatus 1a, and simultaneously starts up the timer 6.

On the other hand, the master communication apparatus 1a waits for the challenge cryptogram 15 while the timer 3 is in effect, and when a plurality of the challenge cryptograms 15 is received, not only from the slave communication apparatus 1b but also from an apparatus other than the slave apparatus, the authentication processing unit 20a stops the authentication and shifts to the "authentication initiation impermissible" state. In the case where only one of the challenge cryptograms 15 is received from the slave communication apparatus 1b, the master communication apparatus 1a extracts the encrypted cryptogram from the challenge cryptogram 15, decrypts the encrypted cryptogram with the common key stored in encryption key storage unit 28a, and when the decrypted challenge matches the challenge sent in the challenge plaintext 14, the master communication apparatus 1a sends the authentication response (successful) 16 to the slave communication apparatus 1b and simultaneously starts up a timer 4. When the two challenges do not match, the master communication apparatus 1a transmits the authentication response (unsuccessful) 16 to the slave communication apparatus 1b and simultaneously shifts to the "authentication unsuccessful" state.

Meanwhile, the slave communication apparatus 1b waits for the authentication response 16 while a timer 7 is in effect, and when the slave communication apparatus 1b receives a plurality of the authentication responses 16 from not only master communication apparatus 1a but also from an apparatus other than the master apparatus, the authentication processing unit 20b stops the authentication and shifts to the "authentication initiation impermissible" state. In the case where the slave communication apparatus 1b receives only one of the authentication responses (successful) 16, the slave communication apparatus 1b starts up a timer 8. In the case where the slave communication apparatus 1b receives only one of the authentication responses (unsuccessful) 16, the slave communication apparatus 1b shifts to the "authentication unsuccessful" state.

On the other hand, when the master communication apparatus 1a receives an input from a button of the apparatus' own input unit 22a while the timer 4 is in effect, the successful authentication is recognized and the master communication apparatus 1a shifts to the "authentication completed" state. In the same way, when the slave communication apparatus 1b receives an input from a button on the apparatus' own input unit 22b, the successful authentication is recognized and the master communication apparatus 1a shifts to the "authentication completed" state. Note that when the master communication apparatus 1a does not receive the predetermined message from a peer before the timer runs down, the master communication apparatus 1a does not re-send a message, stops the authentication without re-sending a message and returns to the "authentication initiation impermissible" state.

The master communication apparatus and the slave communication apparatus, which are in the "authentication initiation permissible" state, wait for an outside directive from the input unit 22's buttons until the timer 4 and the timer 8 run down respectively. When the master communication apparatus and the slave communication apparatus receive an approval directive (for example, one button press), they shift to the "authentication completed" state. When the master communication apparatus and the slave communication apparatus receive a disapproval directive (for example, continuous button pressing), or they do not receive a directive, the apparatuses return to the "authentication initiation permissible" state as an incomplete authentication.

In the authentication process above, the setting of each timer is extremely important with regards to authentication efficiency. This timer setting alteration method is described below.

First, the initial values of any one of, from timer 1 to timer 3, and, from timer 5 to timer 7, are all set to the same value (t0). In the case where the master communication apparatus 1a and the slave communication apparatus 1b are installed apart from each other, the user sets a value for t0 larger than the time necessary for the user to transfer between each user and press the input unit 22's respective buttons. Normally, the apparatuses will set the value to within a few seconds to a minute. Note that the setting is of the t0 value may be changed from the outside by the user.

Figure 5:
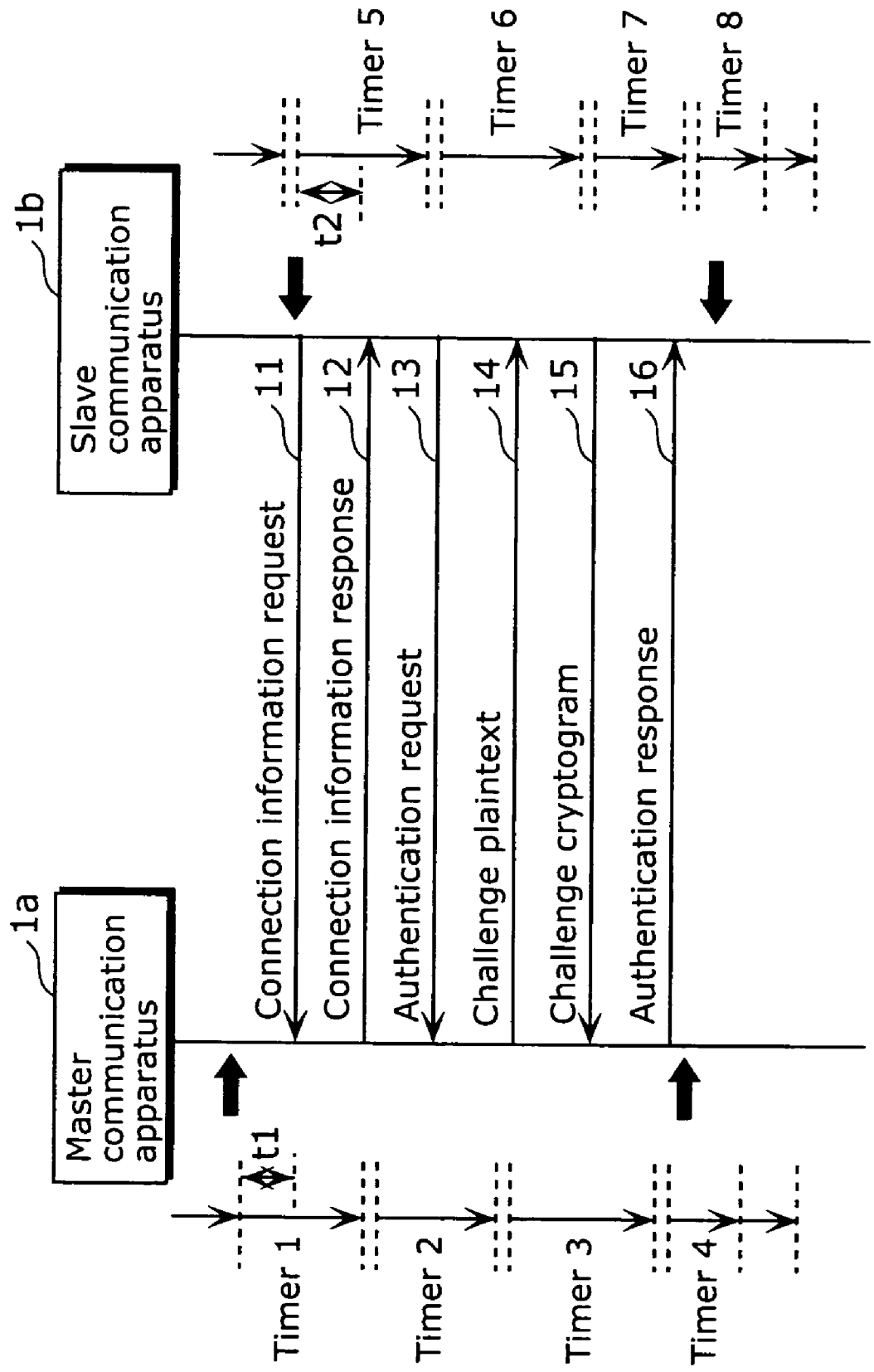
FIG. 5 is a diagram that shows the timer setting in the first embodiment in the present invention.

Afterwards, as shown in FIG. 5, supposing that the connection information request 11 is received, within a time t1 after the timer 1 starts and before it runs down, in the master communication apparatus 1a, the timer management unit 24a changes the initial values of the timer 2 and the timer 3 to (t1+α). In the same way, in the slave communication apparatus 1b as well, when the connection information response 12 is received within the time t2 after the timer 5 starts and before it runs down, the timer management unit 24b changes the initial values of the timer 6 and the timer 7 to (t2+α). Note that α is the largest value of a back-off time for avoiding frame transmission conflicts in a MAC layer.

Also, for the timer 4 and the timer 8, state confirmation and transfer time are taken into consideration according to the user, and are set to a value equivalent to t0 or a value different from t0.

As above, in the present embodiment, it is presupposed that the user presses the button on the master communication apparatus 1a before the communication apparatus 1b, shifts the master communication apparatus 1a to the "authentication initiation" state and performs authentication. One feature of this method is that there is no need for the master communication apparatus 1a to transmit the notification information in a broadcast communication; and so the slave communication apparatus 1b will not receive the notification information, even if it is transmitted to the slave communication apparatus 1b. Accordingly, it is possible to stop identity theft using the notification information.

Note that in the present embodiment, since only the connection information request 11 is being transmitted in the broadcast communication, when a broadcast communication in another message is received, the authentication processing unit 20 may stop the authentication and shift to the "authentication initiation impermissible" state.

Also, in the present embodiment, the communication processing unit 27 may send and receive an authentication message using, for example, a modulation scheme weak to noise such as a 16 PAM (Pulse Amplitude Modulation) pulse amplitude modulation scheme. Using this, demodulation cannot be performed in another communication apparatus and it is possible to prevent a mistaken authentication.

Second Embodiment

Figure 6:
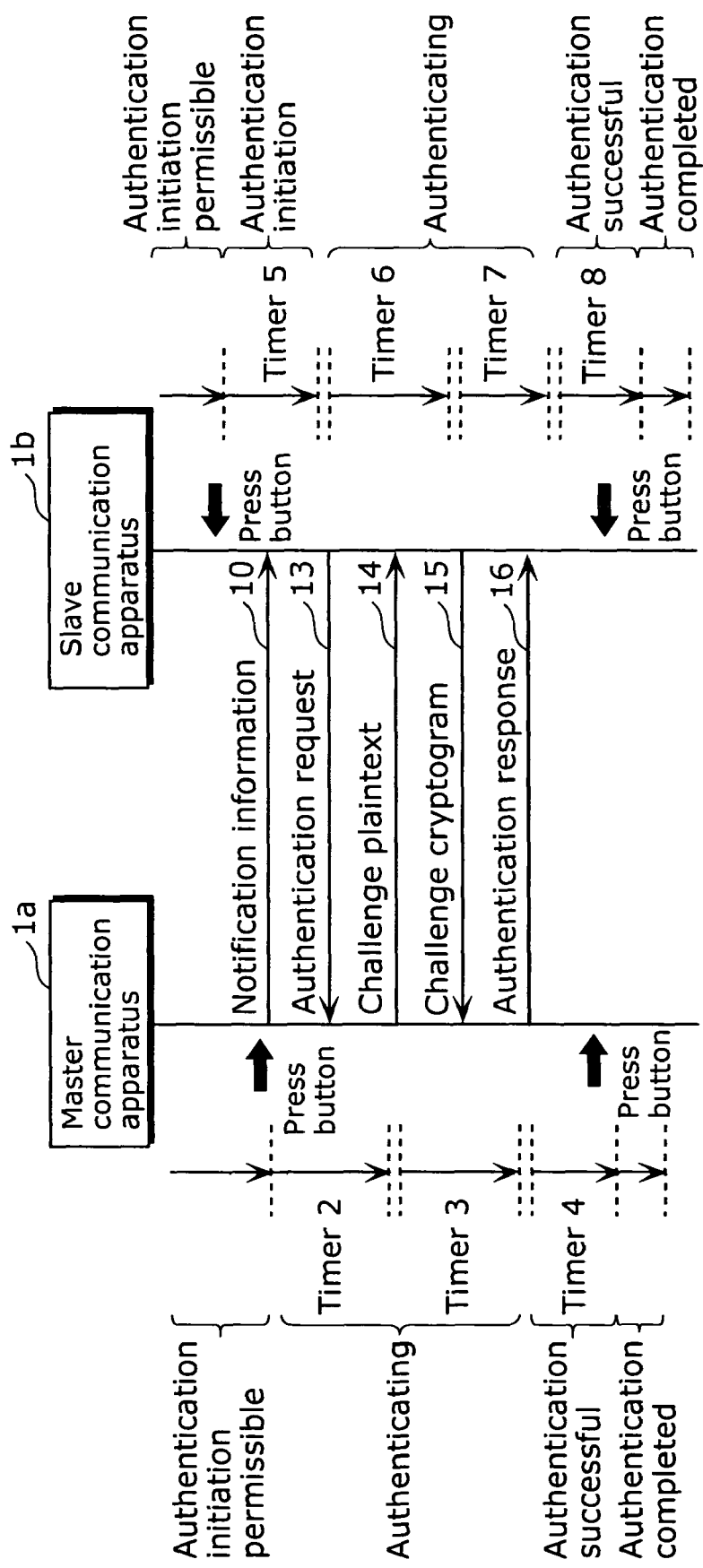
FIG. 6 is an authentication sequence diagram in the second embodiment of the present invention.

FIG. 6 is a figure that shows the authentication sequence in the second embodiment. With respects to the composition of the communication apparatus, the messages used, as well as the common states in the authentication of the master and slave communication apparatuses, the second embodiment is the same as the first embodiment and the description is omitted.

When the master communication apparatus 1a receives a directive from a button on the apparatus' own input unit 22, it sends out the notification information 10 in a broadcast communication and simultaneously starts up the apparatus' own timer 2.

Meanwhile, the slave communication apparatus 1b starts up its own timer 5 and waits for the notification information 10 from the master communication apparatus 1a. When the slave communication apparatus 1b receives a plurality of the notification information 10 while the timer 5 is in effect, from not only the master communication apparatus 1a but also from an apparatus other than the master apparatus, the authentication processing unit 20b stops the authentication and shifts the slave communication apparatus 1b to the "authentication initiation impermissible" state. In the case where only one of the notification information 10 is received, the slave communication apparatus 1b returns the authentication request 13 to the master communication apparatus 1a and simultaneously starts up the timer 6. Since the steps hereafter are identical to those described in the first embodiment above, the description is omitted here.

Next, the setting change method for the timer in the present embodiment is described. Note that the setting for the initial value of the timer is identical to the first embodiment, and the description is omitted.

Figure 7:
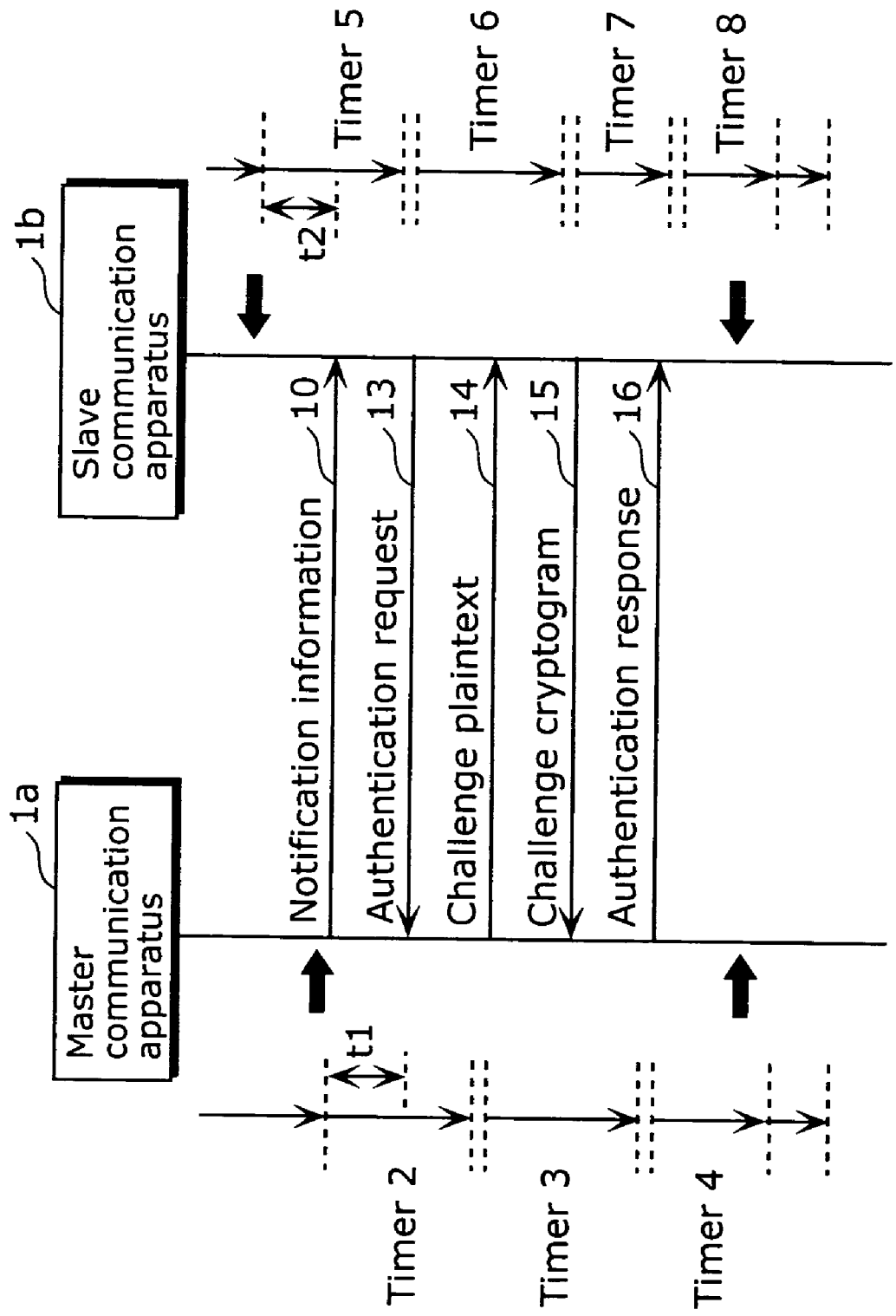
FIG. 7 is a diagram that shows the timer setting in the second embodiment of the present invention.

After setting the initial value, as shown in FIG. 7, when the authentication request 13 is received within a time t1, after the timer 2 starts and before it runs down, the timer management unit 24a changes the initial value of the timer 3 to (t1+α) for the master communication apparatus 1a. In the same way, when the notification information 10 is received within a time t2, after the timer 5 starts and before the timer 5 runs down, the timer management unit 24b changes the initial value of the timer 6 and the timer 7 to (t2+α) for the master communication apparatus 1b. Note that α is the largest value of a back-off time for avoiding frame transmission conflict in a MAC layer.

As above, in the present embodiment, it is presumed that the user presses the button on the slave communication apparatus 1b before the communication apparatus 1a, shifts the master communication apparatus 1a to the "authentication initiation" state and performs authentication. One feature of this method is that there is no need for the slave communication apparatus 1b to transmit the connection request information in a broadcast communication; and for the master communication apparatus 1a, even if the notification information is transmitted to the master apparatus, it will not receive the notification information. Accordingly, it is possible to stop identity theft using the connection request information.

Third Embodiment

Figure 8:
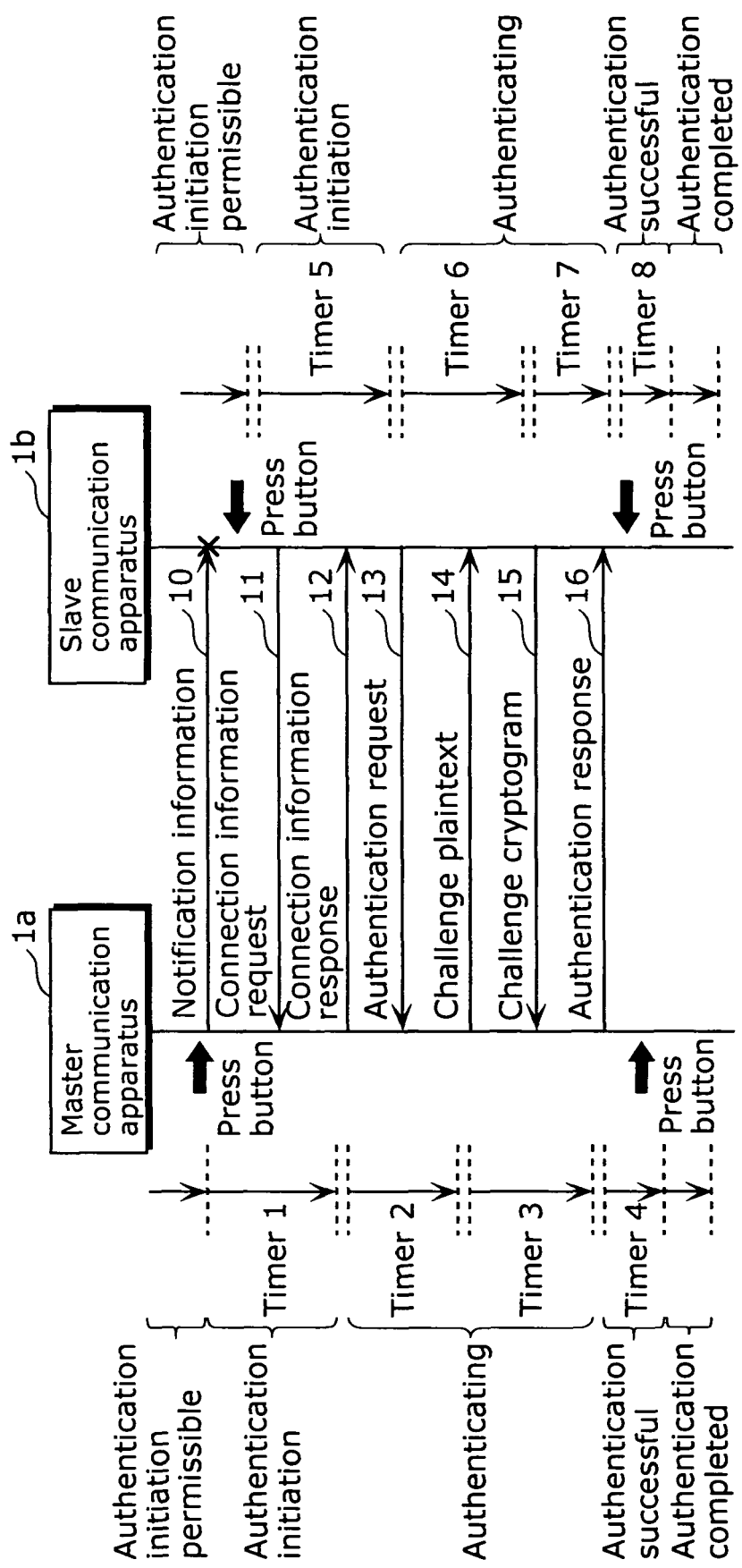
FIG. 8 is an authentication sequence diagram in the third embodiment of the present invention.
Figure 9:
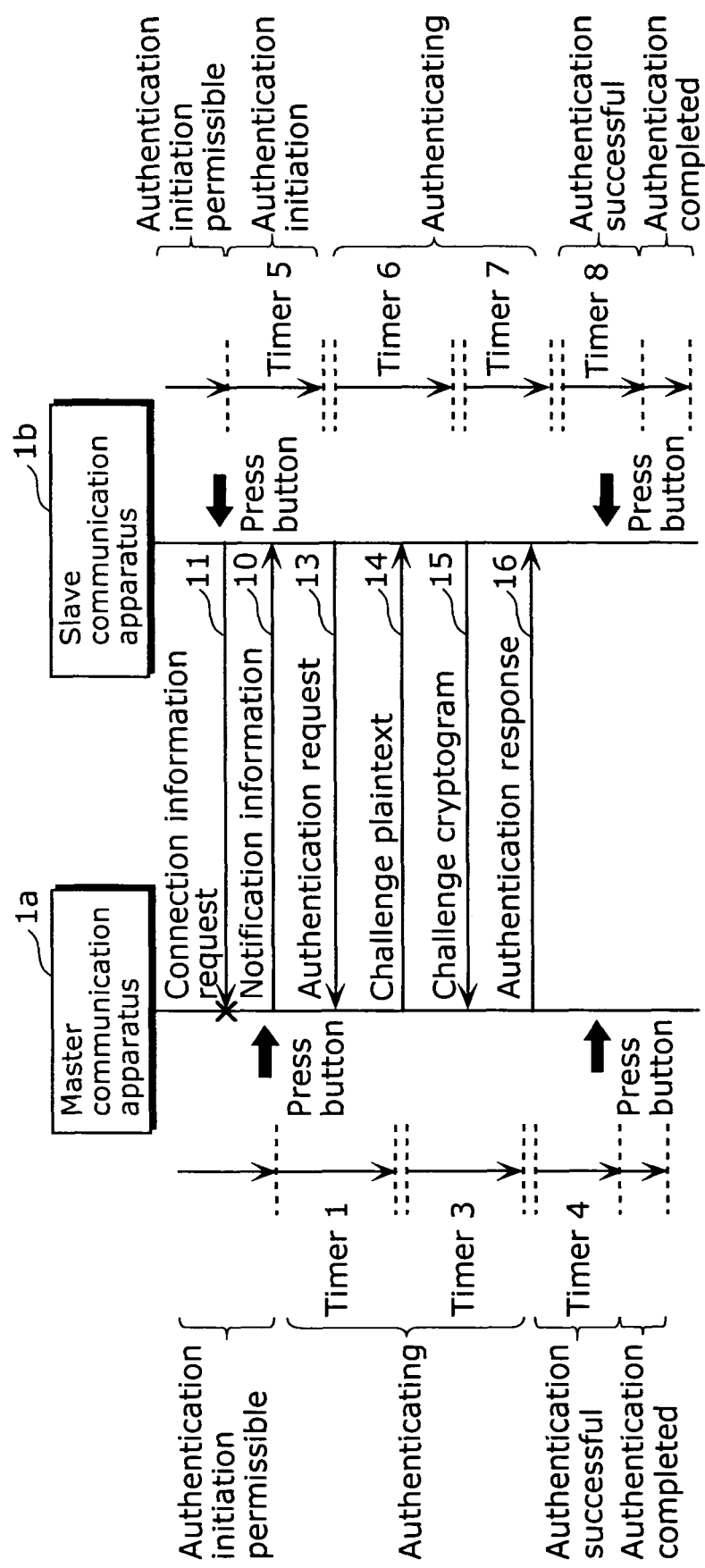
FIG. 9 is an authentication sequence diagram in the third embodiment of the present invention.

FIG. 8 and FIG. 9 are figures that show the authentication sequence in the third embodiment. With respects to the composition of the communication apparatus, the messages used, as well as the common state in the authentication for a master and slave communication apparatuses, the third embodiment is the same as the first embodiment and the description is omitted.

Once the master communication apparatus 1a receives a directive from a button on the apparatus' own input unit 22a, the master communication apparatus 1a immediately sends out the notification information 10 in a broadcast communication. Meanwhile, once the slave communication apparatus 1b receives a directive from a button on the apparatus' own input unit 22b, the slave communication apparatus 1b immediately sends out a connection information request 11 by broadcast communication. In the example in FIG. 8, the authentication sequence is shown for the case where input from a button on the input unit 22 is received in the master communication apparatus 1a before the slave communication apparatus 1b. In this case, even if the notification information 10 from the master communication apparatus 1a is transmitted as a broadcast communication, the slave communication apparatus 1b is not yet in the "authentication initiation state" and so the notification information 10 is ignored. Since the steps afterward are the same as in the steps described in the first embodiment above, the descriptions are omitted here.

Again, in the example in FIG. 9, the authentication sequence is shown for the case where input from a button on the input unit 22 is received in the slave communication apparatus 1b before the master communication apparatus 1a. In this case, even if the connection information request 11 is transmitted from the slave communication apparatus 1b in a broadcast, since the master communication apparatus 1a is not yet in the "communication initiation" state, the connection information request 11 is ignored. Also, in the case where only one of the authentication requests 13 is received in the master communication apparatus 1a, while the timer 1 is in effect, the master communication apparatus 1a starts up the timer 3, not the timer 2. Since the steps afterward are the same as in the steps described in the first embodiment above, the descriptions are omitted here.

Note that it is possible to change the initial value of the timer in the present embodiment with the same methods as in the above first and second embodiment.

As above and in the present embodiment, when the user shifts the apparatus to the "authentication initiation" state, the user can reliably perform authentication no matter if the user presses the button on the master communication apparatus 1a first or the button on the slave communication apparatus 1b first.

Note that in the first embodiment, the second embodiment and the third embodiment above, the following process may also be performed.

Figure 10:
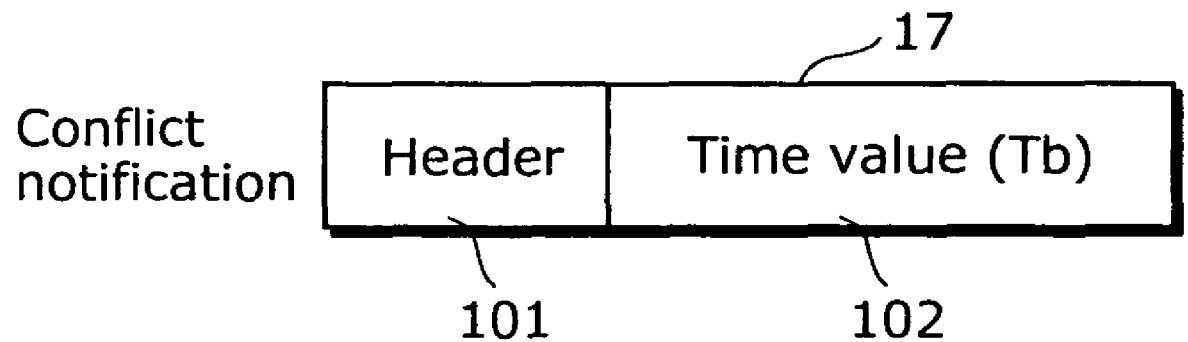
FIG. 10 is a diagram that shows a conflict notification format.

When the master communication apparatus 1a or the slave communication apparatus 1b receives a plurality of the same type of message before the timer runs down, while in the "authentication initiation" and in the "authenticating" state, the communication apparatus transmits the conflict notification 17 to the source of the messages, as in FIG. 10 for example. The format of the conflict notification 17 uses the format of a normal MAC layer frame, and a special time value field (TB) 102. The communication apparatus which has received the conflict notification 17 stops authentication immediately, and shifts itself to the "authentication initiation impermissible" state. The time length of the "authentication initiation impermissible" state is decided by the time value (Tb) 102 included in the conflict notification 17, and when Tb elapses, the apparatus returns to the "authentication initiation permissible" state. By doing so, the communication apparatus which received the plurality of messages can control when authentication of the peer should be re-initiated.

Also, each functional block in the block diagram shown in FIG. 2 is typically achieved in the form of an LSI integrated circuit. Each of these parts can be in plural single-function LSIs, or can also be in one integrated LSI. (For example, function blocks other than memory may be in one integrated LSI.) The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. A Field Programmable Gate Array (FPGA) that can be programmed after manufacturing LSI, or a reconfigurable processor that allows re-configuration of the connection or configuration of LSI can be used for the same purpose.

In the future, with advancement in semi-conductor technology or a new technology deriving there from, a brand-new technology may replace LSI. The integration can be carried out by that technology. Application of biotechnology is one such possibility.

The communication apparatus according to the present invention is capable of preventing a mistaken authentication and a mistaken connection, caused by signal interference with a communication apparatus other than a predetermined communication apparatus peer, and is useful for instance as an authentication scheme for the initial connection time between apparatuses in for example a home wireless LAN and power-line communications. The apparatus may also be applied to authentication among apparatuses on other types of wired and wireless networks (for instance Bluetooth, ECHONET and so on).

The invention claimed is:

1. A communication apparatus that performs authentication for a connection with another communication apparatus and then performs communication with the other communication apparatus, the communication apparatus comprising:
a state management unit configured to manage a state in the authentication as one state among a plurality of predetermined states;
a duplication detection unit configured to detect, in a specified state among the plurality of states, a duplicate receipt of a message related to authentication transmitted from the other communication apparatus; and
an authentication unit,
wherein, in the specified state,
the communication apparatus receives, from the other communication apparatus, the message related to authentication of one type among predetermined types,
said duplication detection unit is configured to specify a time period for each predetermined type of message, to measure the time period, and to detect whether or not the communication apparatus has the duplicate receipt of the message related to the authentication within the specified time period, and
said authentication unit is configured to continue an authentication operation in the case where said duplication detection unit does not detect the duplicate receipt of the message related to the authentication within the specified time period but receives the message related to the authentication and to stop the authentication operation in the case where the duplicate receipt of the message related to the authentication is detected by said duplication detection unit within the specified time period.

2. The communication apparatus according to claim 1,
wherein the plurality of states includes an authentication initiation permissible state, an authentication initiation impermissible state, an authentication initiation state, an authenticating state, an authentication successful state, an authentication unsuccessful state and an authentication completed state, and
said state management unit is configured to manage a state in the authentication operation as one of the states among the authentication initiation permissible state, the authentication initiation impermissible state, the authentication initiation state, the authenticating state, the authentication successful state, the authentication unsuccessful state and the authentication completed state.

3. The communication apparatus according to claim 2, further comprising:
an authentication initiation acceptance unit configured to accept an authentication initiation operation when the state is an authentication initiation permissible state;
wherein said state management unit is configured to shift the state from the authentication initiation permissible state to the authentication initiation state in the case where the authentication initiation operation is accepted by said authentication initiation acceptance unit, and
said authentication initiation acceptance unit is configured to accept the message related to the authentication, when the state is the authentication initiation state.

4. The communication apparatus according to claim 2, further comprising:
an authentication completion acceptance unit configured to accept an authentication completion operation which is an input from outside, when the state is the authentication successful state,
wherein said state management unit is configured to shift the state from the authentication successful state to the authentication completed state when the authentication completion operation is accepted by said authentication completion acceptance unit, and
said authentication unit is configured to perform an authentication completion process when the authentication completion operation is accepted by said authentication completion acceptance unit.

5. The communication apparatus according to claim 2, further comprising:
a display unit configured to display the state when the state is at least one of the authentication initiation permissible state, the authentication initiation impermissible state, the authentication initiation state, the authenticating state, the authentication successful state, the authentication unsuccessful state and the authentication completed state.

6. The communication apparatus according to claim 2,
wherein said state management unit is configured to shift the state from the authentication initiation permissible state to the authentication initiation impermissible state when the message related to the authentication is received from the other communication apparatus, in the case where the state is the authentication initiation permissible state.

7. The communication apparatus according to claim 2,
wherein said authentication unit is configured to wait for a connection information request that requests information necessary for a connection, the information being the message related to the authentication, when the state is shifted to the authentication initiation state.

8. The communication apparatus according to claim 2,
wherein said authentication unit is configured to transmit, by broadcast communication, a connection information request as the message related to the authentication, which requests information necessary for a connection, and to wait for a connection information response when the state is shifted to the authentication initiation state, the connection information response being a response to the connection information request.

9. The communication apparatus according to claim 2,
wherein said authentication unit is configured to transmit notification information by broadcast communication, which notifies of information necessary for the connection, and to wait for the authentication request when the state is shifted to the authentication initiation state, the authentication request being a response to the notification information.

10. The communication apparatus according to claim 2,
wherein said authentication unit is configured to wait for notification information which notifies of information necessary for a connection, the information being the message related to the authentication, when the state is shifted to the authentication initiation state.

11. The communication apparatus according to claim 2,
wherein said authentication unit is configured to transmit, in a broadcast communication, one of a connection information request which requests information necessary for a connection, and the notification information which notifies of information necessary for the connection, as the message related to the authentication, when the state is shifted to the authentication initiation state.

12. The communication apparatus according to claim 2,
wherein said duplication detection unit is configured to detect a duplicate receipt of a connection information request, which is the message related to the authentication transmitted from the other communication apparatus, when the state is the authentication initiation state;

in the case where the state is the authentication initiation state, said authentication unit is configured to transmit a connection information response, which notifies of information necessary for the connection, to the other communication apparatus, which has transmitted the connection information request, when one of the connection information requests is received without a duplicate receipt of the connection information request being detected by said duplication detection unit, within a specified time period from the time of shift to the authentication initiation state, and to stop the authentication operation when a duplicate receipt of the connection information request is detected by said duplication detection unit, within the specified time period from the time of shift; and said state management unit is configured to shift the state from the authentication initiation state to the authenticating state when one of the connection information requests is received, without a duplicate receipt of the connection information request being detected by said duplication detection unit, within the specified time period from the time of shift; and to shift the state from the authentication initiation state to the authentication initiation impermissible state when a duplicate receipt of the connection information request is detected by said duplication detection unit, within the specified time period from the time of shift.

13. The communication apparatus according to claim 2, wherein said duplication detection unit is configured to detect the duplicate receipt of a connection information response, which is the message related to the authentication transmitted from the other communication apparatus, when the state is the authentication initiation state;

in the case where the state is an authentication initiation state, said authentication unit is configured to transmit an authentication request to the other communication apparatus, which has transmitted the connection information response, when one of the connection information responses is received without a duplicate receipt of the connection information response being detected by said duplication detection unit, within a specified time period from the time of shift to the authentication initiation state; and to stop the authentication operation when a duplicate receipt of the connection information response is detected by said duplication detection unit, within the specified time period from the time of shift; and said state management unit is configured to shift the state from the authentication initiation state to the authenticating state when one of the connection information responses is received without a duplicate receipt of the connection information response being detected by said duplication detection unit, within the specified time period from the time of shift; and to shift the state from the authentication initiation state to the authentication initiation impermissible state when a duplicate receipt of the connection information request is detected by said duplication detection unit, within the specified time period from the time of shift.

14. The communication apparatus according to claim 2, wherein said duplication detection unit is configured to detect the duplicate receipt of the notification information, which is the message related to the authentication transmitted from the other communication apparatus, when the state is the authentication initiation state;

in the case where the state is the authentication initiation state, said authentication unit is configured to transmit an authentication request to the other communication apparatus, which has transmitted the notification information, when one of the notification information is received without a duplicate receipt of the connection information response being detected by said duplication detection unit, within a specified time period from a time of shift to an authentication initiation state; and to stop the authentication operation when a duplicate receipt of the notification information is detected by said duplication detection unit within the specified time period from the time of shift; and said state management unit is configured to shift the state from the authentication initiation state to the authenticating state when one of the notification information is received without a duplicate receipt of the notification information being detected by said duplication detection unit, within the specified time period from the time of shift; and to shift the state from the authentication initiation state to the authentication initiation impermissible state when a duplicate receipt of the notification information is detected by said duplication detection unit, within the specified time period from the time of shift.

15. The communication apparatus according to claim 2, further comprising:

a key storage unit configured to store a common key necessary for encryption or decryption of a challenge;

wherein said duplication detection unit is configured to detect the duplicate receipt of an authentication request, which is the message related to the authentication, transmitted from the other communication apparatus, when the state is the authenticating state;

in the case where the state is the authenticating state, said authentication unit is configured to transmit a challenge plaintext to the other communication apparatus, which has transmitted the authentication request, when one of the authentication requests is received without a duplicate receipt of the connection information response being detected by said duplication detection unit, within a specified time period from a time of shift to the authenticating state, and to stop the authentication operation when a duplicate receipt of the authentication request is detected by said duplication detection unit, within the specified time period from the time of shift; and said state management unit is configured to shift the state from the authenticating state to the authentication impermissible state when a duplicate receipt of the authentication request is detected by said duplication detection unit, within the specified time period from the time of shift.

16. The communication apparatus according to claim 15, wherein said duplication detection unit is configured to detect the duplicate receipt of a challenge cryptogram, which is the message related to the authentication transmitted from the other communication apparatus, when the state is the authenticating state;

in the case where the state is the authenticating state, said authentication unit is configured to decrypt the received challenge cryptogram with the common key stored in said key storage unit, when one of the authentication requests is received without a duplicate receipt of the challenge cryptogram being detected by said duplication detection unit, within a specified time period from the time of the transmission of the challenge plaintext; to transmit an authentication response indicating an authentication successful to the other transmission apparatus, which has transmitted the challenge cryptogram, when the transmitted challenge plaintext matches the decrypted challenge plaintext, and to transmit an authentication response indicating authentication unsuccessful when the transmitted challenge plaintext does not match the decrypted challenge plaintext; and to stop the authentication operation when a duplicate receipt of the challenge cryptogram is detected by said duplication detection unit, within the specified time period from the time of transmission; and said state management unit is configured to shift the state from the authenticating state to the authentication successful state when the authentication response indicating an authentication successful is transmitted; to shift the state from the authenticating state to the authentication unsuccessful state when the authentication response indicating an authentication unsuccessful is transmitted; and to shift the state from the authenticating state to the authentication initiation impermissible state when a duplicate receipt of the challenge cryptogram is detected by said duplication detection unit, within the specified time period from the time of shift.

17. The communication apparatus according to claim 2, further comprising:

a key storage unit configured to store a common key necessary for one of encryption and decryption;

wherein said duplication detection unit is configured to detect the duplicate receipt of a challenge cryptogram, which is the message related to the authentication, transmitted from the other communication apparatus, when the state is the authenticating state;

in the case where the state is the authenticating state, said authentication unit is configured to encrypt the challenge plaintext by the common key stored in said key storage unit, when one of the challenge plaintext is received without a duplicate receipt of the challenge plaintext being detected by said duplication detection unit, within a specified time period from the time of shift to an authentication initiation state; to transmit the encrypted challenge cryptogram to the other communication apparatus, which has transmitted the challenge plaintext; and to stop the authentication operation when a duplicate receipt of the challenge plaintext is detected by said duplication detection unit, within the specified time period from the time of shift; and said state management unit is configured to shift the state from the authenticating state to the authentication initiation impermissible state when a duplicate receipt of the authentication request is detected by said duplication detection unit, within the specified time period from the time of shift.

18. The communication apparatus according to claim 17, wherein said duplication detection unit is configured to detect the duplicate receipt of an authentication response that indicates one of authentication successful and authentication unsuccessful, which is the message related to the authentication transmitted from the other communication apparatus, when the state is the authenticating state;

said authentication unit is configured, in the case where the state is an authenticating state, to stop the authentication operation when a duplicate receipt of the authentication response is detected by said duplication detection unit within the specified time period from the time of the challenge cryptogram's transmission; and said state management unit is configured to shift the state to one of the authentication successful state and the authentication unsuccessful state, according to the authentication response, when one of the authentication responses is received without a duplicate receipt of the authentication response being detected by said duplication detection unit, within the specified time period from the time of transmission; and to shift the state from the authenticating state to the authentication initiation impermissible when a duplicate receipt of the authentication response is detected by said duplication detection unit within the specified time period from the transmission time.

19. The communication apparatus according to claim 2, further comprising:

a timer management unit configured to manage each state including the authentication initiation impermissible state, the authentication initiation state, the authenticating state, the authentication successful state, the authentication unsuccessful state; and the authentication completed state by an initial value which is the specified time period set in advance with respectively differing timers, and to adjust the initial value of each timer after initiating authentication.

20. The communication apparatus according to claim 2, wherein said duplication detection unit is configured to transmit a conflict notification to the other communication apparatus, which has transmitted the message related to the specified authentication, and where the message related to the specified authentication is received in duplicate, in the case where the state is one of the authentication initiation state and the authenticating state; the conflict notification includes a time value which indicates the length of time at which the other apparatus should be in the authentication initiation impermissible state.

21. The communication apparatus according to claim 20, further comprising:

a timer management unit configured to manage the authentication initiation impermissible state by an initial value which is the specified time period set in advance with a timer; and to take the time value as the initial value of the timer in the case where the conflict notification is received.

22. The communication apparatus according to claim 1, further comprising:

a send and receive unit configured to send and receive the message related to the authentication, using a modulation scheme susceptible to a noise.

23. The communication apparatus according to claim 22 wherein said send and receive unit is configured to use a simulated noise as the noise.

24. An authenticating method for a communication apparatus of performing an authentication for a connection with another communication apparatus, the method comprising:

a state management step of managing a state of the authentication as one state among a plurality of predetermined states;

a duplication detection step of detecting, in a specified state among the plurality of states, a duplicate receipt of a message related to authentication transmitted from the other communication apparatus;

wherein, in the specified state, the communication apparatus receives, from the other communication apparatus, the message related to authentication of one type among predetermined types, and said duplication detection step specifies a time period for each predetermined type of message, to measure the time period, and to detect whether or not the communication apparatus has the duplicate receipt of the message related to the authentication within the specified time period; and an authentication step of continuing the authentication operation, in the case where one of the message related to the authentication is received without the duplicate receipt of the message related to the authentication being detected in the said duplication detection step, within the specified time period and to stop the authentication operation in the case where the duplicate receipt of the message related to the authentication is detected in said duplication detection step, within the specified time period.

25. A program stored on a non-transitory computer-readable recording medium for a communication apparatus used for performing an authentication for a connection with another communication apparatus, the program causing a computer to execute:

a state management step of managing a state of the authentication as one state among a plurality of predetermined states;

a duplication detection step of detecting, in a specified state among the plurality of states, a duplicate receipt of a message related to authentication transmitted from the other communication apparatus;

wherein, in the specified state, the communication apparatus receives, from the other communication apparatus, the message related to authentication of one type among predetermined types, and said duplication detection step specifies a time period for each predetermined type of message, to measure a time period, and to detect whether or not the communication apparatus has the duplicate receipt of the message related to the authentication within the specified time period; and an authentication step of continuing the authentication operation, in the case where the message related to the authentication is received without the duplicate receipt of the message related to the authentication being detected in the said duplication detection step, within the specified time period and to stop the authentication operation in the case where the duplicate receipt of the message related to the authentication is detected in said duplication detection step, within the specified time period.

26. An integrated circuit for a communication apparatus that performs authentication for a connection with another communication apparatus, and then performs communication with the other communication apparatus, the integrated circuit comprising:

a state management unit configured to manage a state in the authentication as one state among a plurality of predetermined states;

a duplication detection unit configured to detect, in a specified state among the plurality of states, a duplicate receipt of a message related to authentication transmitted from the other communication apparatus;

wherein, in the specified state, the communication apparatus receives, from the other communication apparatus, the message related to authentication of one type among predetermined types, and said duplication detection unit is configured to specify a time period for each of the predetermined types of messages, to measure the time period, and to detect whether or not the communication apparatus has a duplicate receipt of the message related to the authentication within the specified time period; and an authentication unit configured to continue an authentication operation in the case where said duplication detection unit does not detect the duplicate receipt of the message related to the authentication within the specified time period but receives the message related to the authentication and to stop the authentication operation in the case where the duplicate receipt of the message related to the authentication is detected by said duplication detection unit within the specified time period.

* * * * *